（12） United States Patent
Odashima et al.

(10) Patent No.: US 9,217,320 B2
(45) Date of Patent: Dec. 22, 2015

(54) MAGNETICALLY CLAMPING A DOWNHOLE COMPONENT TO A DIRECTION OF A BOREHOLE CASING

(71) Applicant: Schlumberger Technology Corporation, Sugar Land, TX (US)

(72) Inventors: Ryuki Odashima, Yokohama (JP); Tatsuki Endo, Sagamihara (JP); Shantonu Ray, Setagaya-sku (JP); Koichi Naito, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 311 days.

(21) Appl. No.: 13/778,095

(22) Filed: Feb. 26, 2013

(65) Prior Publication Data

US 2014/0238669 A1 Aug. 28, 2014

(51) Int. Cl.
| | |
|---|---|
| *E21B 23/01* | (2006.01) |
| *E21B 47/01* | (2012.01) |
| *B05B 5/08* | (2006.01) |
| *B05B 5/16* | (2006.01) |
| *B05C 19/00* | (2006.01) |
| *G01V 11/00* | (2006.01) |

(52) U.S. Cl.
CPC .................. *E21B 47/01* (2013.01); *B05B 5/081* (2013.01); *B05B 5/084* (2013.01); *B05B 5/1683* (2013.01); *B05C 19/001* (2013.01); *B05C 19/002* (2013.01); *G01V 11/005* (2013.01)

(58) Field of Classification Search
CPC ......... E21B 23/01; E21B 47/01; E21B 47/09; E21B 49/00; E21B 47/022; G01V 11/005
See application file for complete search history.

(56) References Cited

U.S. PATENT DOCUMENTS

| | | | |
|---|---|---|---|
| 4,438,810 A * | 3/1984 | Wilkinson | 166/66.5 |
| 7,187,620 B2 | 3/2007 | Nutt et al. | |
| 7,567,485 B2 | 7/2009 | Nutt et al. | |
| 7,721,809 B2 | 5/2010 | Minto | |
| 7,841,403 B2 * | 11/2010 | Minto et al. | 166/255.2 |
| 2003/0081501 A1 | 5/2003 | Nightingale et al. | |
| 2003/0179651 A1 | 9/2003 | Nutt et al. | |
| 2004/0223410 A1 | 11/2004 | West et al. | |
| 2008/0211228 A1 | 9/2008 | Carson | |
| 2009/0308617 A1 | 12/2009 | Minto | |

OTHER PUBLICATIONS

International search report and written opinion for the equivalent PCT patent application No. PCT/US2014/017896 issued on Jun. 3, 2014.

* cited by examiner

*Primary Examiner* — Shane Bomar
*Assistant Examiner* — Kipp Wallace
(74) *Attorney, Agent, or Firm* — Daryl R. Wright; Jody DeStefanis

(57) ABSTRACT

Systems and methods for magnetically autonomously clamping a downhole component in a select direction of a borehole casing. The systems can include a sensor package that obtains a downhole measurement in a position in a cased borehole. The systems can include an integral magnetic clamp that removably clamps the downhole component (e.g., a downhole seismic shuttle) to the cased borehole. The systems can include a directional detector that outputs a select direction of the cased borehole relative to the downhole component. The systems can include a downhole controller that activates a portion of the integral magnetic clamp of the downhole component closest to the select direction output by the directional detector.

20 Claims, 8 Drawing Sheets

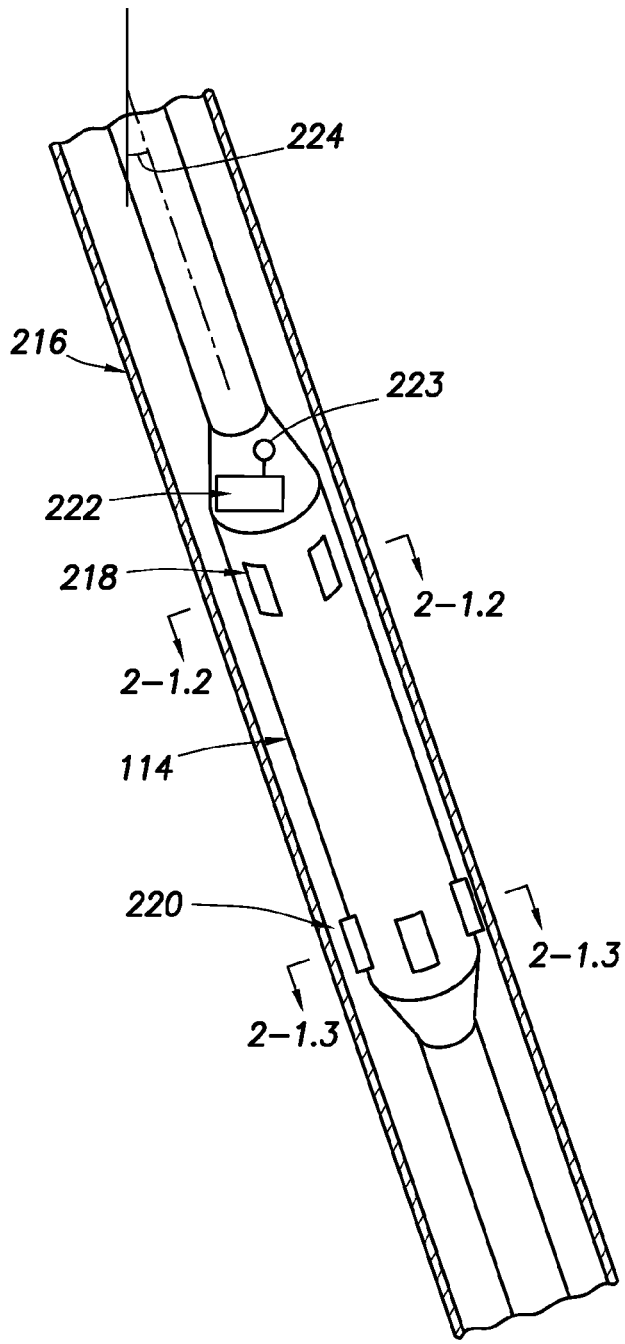
FIG.2-1.1
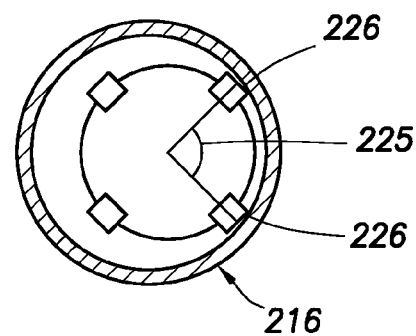
FIG.2-1.2
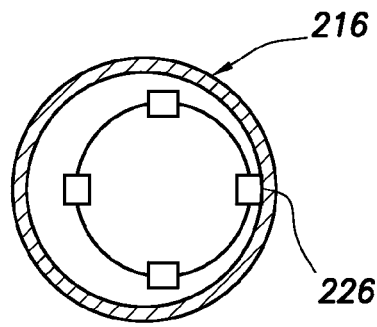
FIG.2-1.3

MAGNETICALLY CLAMPING A DOWNHOLE COMPONENT TO A DIRECTION OF A BOREHOLE CASING

BACKGROUND

The present disclosure relates to wellbore-deployed sensors. More specifically, the present disclosure relates to autonomously magnetically clamping a downhole component, such as a seismic shuttle, to a particular direction of a borehole casing, such as a gravitational low-side of the borehole casing.

Wellbore sensors, such as wellbore seismic receivers, may be used to detect signals from within wellbores drilled through subsurface formations. Seismic signals, for example, may be naturally occurring, caused by reservoir activity, hydraulic fracturing or a seismic energy source deployed at the Earth's surface or in another wellbore to provide seismic energy for a wellbore seismic survey.

An aspect of using wellbore sensors is a device or means to secure the wellbore sensor into contact with the wall of the wellbore, or more specifically, into contact with a borehole casing installed in a well. For example, for seismic wellbore sensors, the contact (i.e., acoustic coupling) between the wellbore sensor and the borehole casing enables seismic energy to be communicated to the wellbore sensor.

Techniques for clamping a wellbore sensor or source to a borehole casing are provided in U.S. Pat. Nos. 7,187,620; 7,567,485; and 7,721,809, each commonly assigned to the assignee of the present disclosure.

SUMMARY

In at least one aspect, the disclosure relates to an autonomously magnetically clamping downhole seismic shuttle for clamping to a select direction of a borehole casing. The downhole seismic shuttle can include a sensor package that obtains a downhole measurement in a position in a cased borehole. The downhole seismic shuttle can include a magnetic clamp that removably clamps the downhole seismic shuttle to the cased borehole. The downhole seismic shuttle can include a directional detector that outputs a select direction of the cased borehole relative to the downhole seismic shuttle. The downhole seismic shuttle can include a downhole controller coupled to the magnetic clamp and the directional detector. The downhole controller may activate a portion of the magnetic clamp of the downhole seismic shuttle closest to the select direction.

In at least one aspect, the disclosure relates to an apparatus for autonomously magnetically clamping a downhole component to a select direction of a borehole casing. The apparatus can include a downhole component that clamps to a position in a cased borehole. The apparatus can include a magnetic clamp that removably clamps the downhole component to the cased borehole. The apparatus can include a directional detector that outputs a select direction of the cased borehole relative to the downhole component. The apparatus can include a downhole controller coupled to the magnetic clamp and the directional detector. The downhole controller can activate a portion of the magnetic clamp of the downhole component closest to the select direction.

In at least one aspect, the disclosure relates to a method for autonomously magnetically clamping a downhole seismic shuttle to a select direction of a borehole casing. The method can include disposing a magnetically clampable shuttle in a cased borehole. The shuttle can include a sensor package that obtains a downhole measurement in a position in a cased borehole. The shuttle can include a magnetic clamp that removably clamps the shuttle to the cased borehole. The shuttle can include a directional detector that outputs a select direction of the cased borehole relative to the shuttle. The shuttle can include a downhole controller coupled to the magnetic clamp and the directional detector. The downhole controller may activate a portion of the magnetic clamp of the downhole seismic shuttle closest to the select direction. The method can include determining with the directional detector the select direction of the cased borehole. The method can include selectively activating with the downhole controller a portion of the magnetic clamp of the magnetically clampable shuttle closest to the select direction.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for magnetically clamping a downhole component in select direction of a borehole casing, such as a gravitational low-side, are described with reference to the following figures. Like numbers are used throughout the figures to reference like features and components.

FIGS. 2-1.1, 2-1.2, 2-1.3 are a related cross-sectional side view of a sensor shuttle in a deviated well, with callouts related to top and bottom poles, in accordance with an embodiment of the present disclosure;

FIG. 2-2 is a block diagram of a downhole controller of the sensor shuttle of FIG. 2-1;

FIG. 3-1 is a top view cross-section of a magnetic clamp for a downhole sensor shuttle when not magnetically clamped in accordance with an embodiment of the present disclosure;

FIG. 3-2 is a cross-sectional side view of a magnetic clamp for a downhole sensor shuttle when magnetically clamped in accordance with an embodiment of the present disclosure;

FIG. 3-3 is a top view cross-section of a magnetic clamp for a downhole sensor shuttle when magnetically clamped in accordance with an embodiment of the present disclosure;

FIG. 3-4 is a top view cross-section of a magnetic clamp for a downhole sensor shuttle when magnetically clamped in accordance with an embodiment of the present disclosure;

FIG. 4 is a detailed view of inner and outer pole pieces of a magnetic clamp for a downhole sensor shuttle in accordance with an embodiment of the present disclosure.

DETAILED DESCRIPTION

Figure 1:
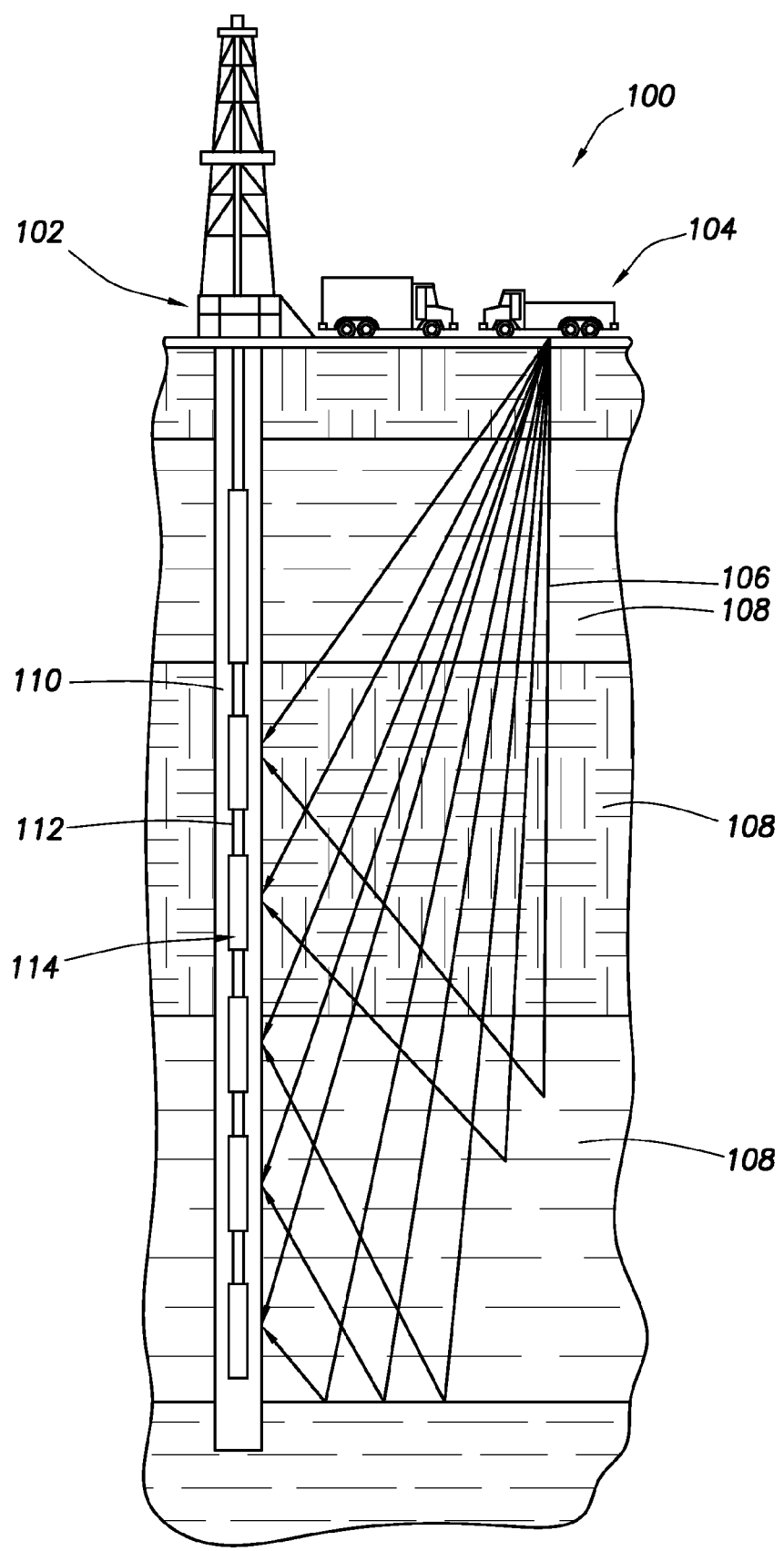
FIG. 1 is a diagrammatic view depicting an example wellsite with a representation of a cross-section of subsurface formations with a borehole extending therethrough.

In the following description, numerous details are set forth to provide an understanding of the present disclosure. However, it will be understood by those skilled in the art that the present disclosure may be practiced without these details and that numerous variations or modifications from the described embodiments are possible.

A magnetic clamp may be used to couple wellbore sensors to a borehole casing. A magnetic clamp is compact compared to mechanical surface force clamping devices because the magnetic clamp does not involve engagement of or movement of mechanical parts exposed outside a sensor housing. Without mechanical anchoring arms, a magnetic clamp reduces overall size of wellbore sensors. Also, a magnetic clamp does not have to be positioned in a side passageway away from the primary flow passageway of the well. A magnetic clamp is described, for example, in U.S. Pat. No. 7,187,620.

The present disclosure describes a directional magnetic clamp mechanism and control logic that includes a directional detector to automate selectively activating and magnetizing the magnetic clamp in a selected direction, for example, on the gravitational low-side of the casing, thereby adding the weight of the sensor housing, or shuttle, to the coupling force. In seismic tool development, for example, in order to acquire stable acoustic data a ratio of the mass of the sensor housing to the coupling force could be around 10, depending on each component mass, shape and configuration. By clamping the sensor to the low-side of the casing in the direction of gravity, the mass of the shuttle contributes to, rather than subtracts from, the overall coupling force needed to achieve coupling. In an example, a sensor shuttle mass could be in the range of about 30 Newtons (N) to 50 N, for which a target clamping force would be in excess of 300 N. If magnetically clamped on the high-side of the borehole, gravity would detract from the clamping force; however, if magnetically clamped on the low-side of the borehole, gravity would contribute to the clamping force, making the target clamping force more easily achieved.

As referred to herein, in a deviated well (i.e., a well deviating to any degree off of 100% vertical), a "low side" and "high side" may be defined, where the low side is the gravitational bottom of the well at any given point, and the high side is the gravitational top of the well at the same point.

"Automatically," and "autonomously" as used herein, may refer to a downhole unit, such as a controller, commencing an action independently without requiring a command from a surface unit. The terms "automatically" and "autonomously" are used interchangeably herein.

"Multiple point clamp," as used herein, may refer to a plurality of poles affixed to a sensor shuttle housing that are in contact with a borehole casing when one or more internal shuttle components are activated to generate a magnetic flux through at least a plurality of the poles, through the borehole casing, and into the internal shuttle components. A multiple point magnetic clamp is less likely to rock or slip than a single point magnetic clamp.

Referring to FIG. 1, a diagrammatic view of a wellsite 100 is shown with a cross-section of the subsurface formations with a borehole 110 extending therethrough. The diagrammatic view of wellsite 100 depicts well instrumentation 102 at the surface including various associated instrumentation and monitoring systems. Also shown at the surface is a surface source 104, which is depicted as a vibration vehicle, or the source 104 may be an acoustic source deployed into the borehole 110 for generating an acoustic signal in the borehole 110. The plurality of lines 106 are intended to represent excitations or seismic vibrations traveling through the subsurface formations producing seismic data that can be sensed by downhole sensor arrays. The present disclosure can be utilized to record seismic data for conducting a seismic survey of the subsurface formations 108.

Once the borehole 110 has been established, a conveyance line 112, such as a wireline, slick line, coiled tubing or other conveyance can be spooled to extend down through the borehole 110 where an array of seismic sensors (such as sensor shuttle 114, which will be discussed in further detail below) are positioned along the conveyance line 112. Also, the conveyance line 112 with the seismic sensors attached thereto can be extended as the borehole 110 is being established. The array of seismic sensors can be either permanently deployed for continuous production well monitoring or can be temporarily deployed for performing a subsurface seismic survey and then retracted. If the array of seismic sensors is temporarily deployed, the array can be reutilized in a subsequent wellbore operation upon retrieval. The array of seismic sensors may be permanently deployed to continuously monitor production well operations. Once the conveyance line 112 and the plurality of sensor arrays are in position, acquisition of seismic data can begin. If production ceases at the well or for some other reason seismic monitoring is no longer required, the array of seismic sensors can be retracted and reused elsewhere. Note that the diagrammatic illustrations presented herein to describe the present disclosure are for the purpose of illustration and ease of understanding the apparatus and methods of the present disclosure. The diagrammatic illustrations shown and described herein should not be construed to be limiting in any way with respect to the scope of the present disclosure. For example, while six individual sensor shuttles are shown in FIG. 1, any number of sensor packages is contemplated in the present disclosure.

The apparatus may be designed such that a plurality of seismic sensors or seismic sensor arrays can be deployed down a borehole 110 by spooling down an array of seismic sensors attached to a conveyance line 112, i.e., cable line, slickline, coiled tubing or other suitable deployment mechanism. For purposes of this disclosure, when any one of the terms wireline, cable line, slickline or coiled tubing or conveyance is used it is understood that any of the above-referenced deployment means, or any other suitable equivalent means, may be used with the present disclosure without departing from the spirit and scope of the present disclosure. One embodiment may include a plurality of shuttle containers or simply shuttles, each shuttle containing a sensor array with the shuttles being attached along the conveyance line 112. The apparatus is adapted to lower or spool the conveyance line 112 down the borehole 110, and then automatically actuate a magnetic clamp integral with the shuttle to magnetically clamp and acoustically couple the sensors to the borehole 110 casing. The apparatus is further adapted to deactivate the magnetic clamp, thereby unclamping the shuttle and sensors from the borehole casing. The apparatus is further adapted to retract the conveyance line and the plurality of shuttles and sensors attached thereto. The extending or retracting of the conveyance line 112 can be accomplished by a spooling mechanism.

Figure 2:
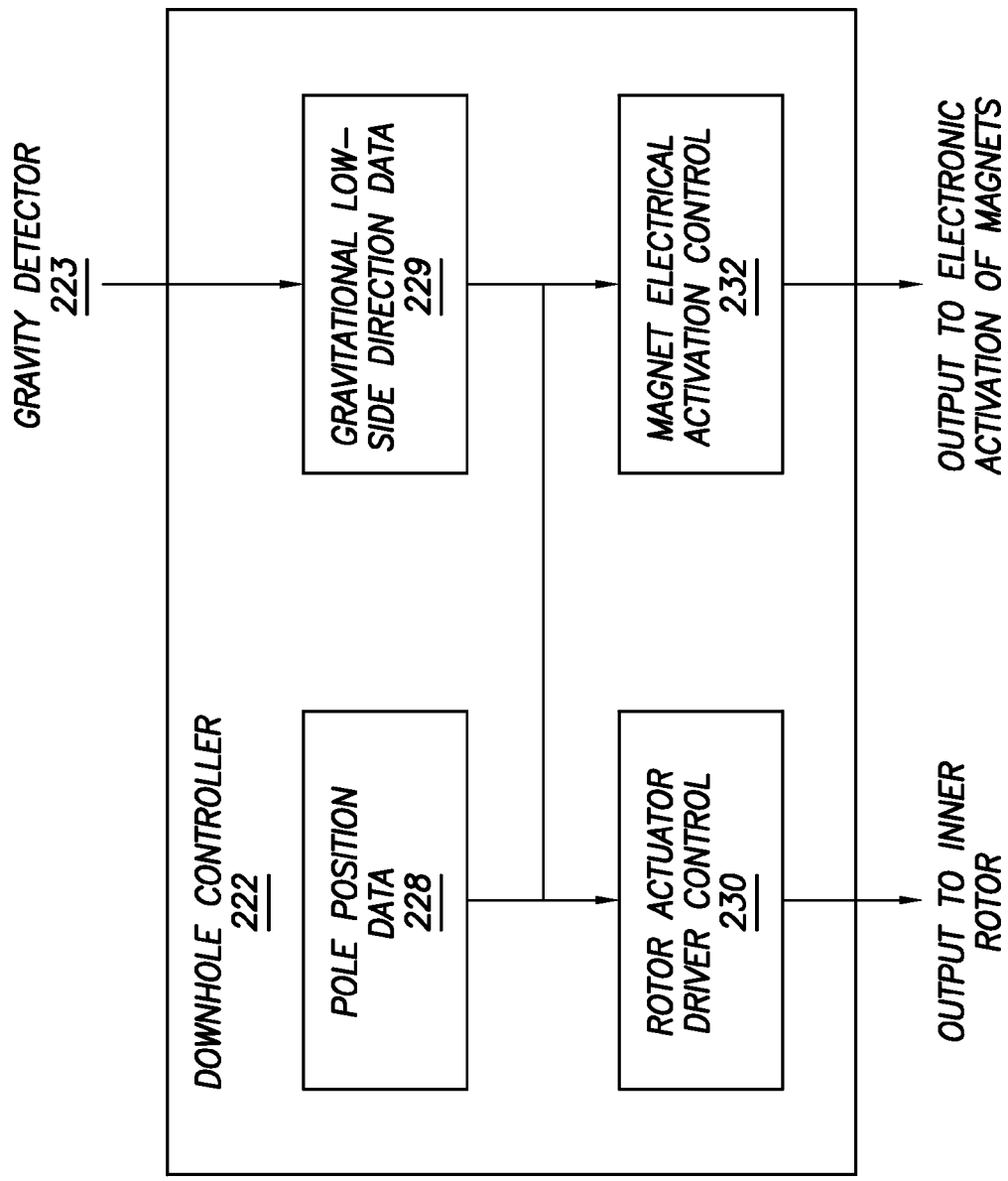

Turning now to FIG. 2-1.1, a blown-up view of a single sensor shuttle 114, as deployed in FIG. 1 along a conveyance line 112 deployed inside a casing 216 in a deviated cased well with an angle of deviation 224 off of true vertical. The sensor shuttle 114 includes a set of upper outer poles 218 and a set of lower outer poles 220, "upper" and "lower" in this context referring to the relative placement of the poles on the shuttle when compared to one another. In an embodiment, both the upper outer poles 218 and the lower outer poles 220 are fabricated combinations of electromagnets (such as, for example but not limited to, Samarium-Cobalt for high temperature applications) and non-magnetic material that, when aligned one or more activated (i.e., magnetized) internal components of the sensor shuttle 114, to be discussed further below with respect to FIGS. 3-1 through 3-3, magnetic flux flows therethrough, forming a magnetic clamp against the casing 216, which may be made of a magnetic material, such as, for example, steel, or other metals.

In an embodiment, each set of upper outer poles 218 and lower outer poles 220 includes a plurality of electromagnets that are polarized in the radial direction when magnetized with an electric current. In an embodiment, the upper outer poles 218 and the lower outer poles 220 may be cylindrically shaped electromagnets. In another embodiment, the upper outer poles 218 and the lower outer poles 220 may be of block shaped electromagnets. In an embodiment, each electromagnet of the upper outer poles 218 and the lower outer poles 220 is mounted in electromagnet pole pieces spaced apart, for example, at intervals so as to be, for example, evenly spaced about the outside of the shuttle 114. For example, in an embodiment, each set of upper outer poles 218 and lower outer poles 220 includes four electromagnet pole pieces, each spaced 90 degrees apart from the next. In another embodiment, each set of upper outer poles 218 and lower outer poles 220 includes six electromagnet pole pieces, each spaced 60 degrees apart from the next.

When permanent magnet internal components of the sensor shuttle 114 (described further below) are aligned with the electromagnet pole pieces and magnetized, magnetic flux is directed out of the electromagnet pole pieces such that the flux comes out of each electromagnet pole piece and goes back through the casing to the adjacent electromagnet pole piece generating a strong clamping force. The clamping force is directed in a direction perpendicular to the casing 216.

As shown in the call-outs FIG. 2-1.2 to the upper outer poles 218 and FIG. 2-1.3 to the lower outer poles 220, the relative alignment of the upper outer poles 218 to the lower outer poles 220 may include a geometric offset 225. For example, in an embodiment having four electromagnet pole pieces 226 in each set of upper outer poles 218 and lower outer poles 220, the upper outer poles 218 may be offset by 45 degrees relative to the lower outer poles 220, such that at any given time when clamped as described herein, a total of three electromagnet pole pieces 226 are in forced contact with the casing 216, as shown in the call-out cross-sections of FIGS. 2-1.2 and 2-1.3. More specifically, as shown, when clamped, two of the electromagnet pole pieces 226 of the upper outer poles 218 and one of the electromagnet pole pieces 226 of the lower outer poles 220 are in magnetically forced contact with the casing 216. A multiple point magnetic clamp is thereby formed, when a plurality of electromagnet poles 226 (three, in this case) from the sets of upper outer poles 218 and lower outer poles 220 are in magnetically forced contact with the casing 216.

For example, in an embodiment having six electromagnet pole pieces in each set of upper outer poles 218 and lower outer poles 220, the upper outer poles 218 may have a geometric offset 225 of 30 degrees relative to the lower outer poles 220, such that at any given time when activated, a total of at least three electromagnet pole pieces are in forced contact with the casing 216. As above, a multiple point magnetic clamp is thereby formed, when a plurality of electromagnet pole pieces from the sets of upper outer poles 218 and lower outer poles 220 are in contact with the casing 216.

In an embodiment, the sensor shuttle 114 also includes a gravity detector 223. In an embodiment, the gravity detector 223 includes a 3-axis accelerometer, such as, for example, a commercially available MURATA ELECTRONICS™/VTI Technologies™ Automotive Digital Accelerometer. The output of the gravity detector 223 is an indicator of which direction, relative to the sensor shuttle 114, is gravitationally lowest, and in turn, enables a determination of which outer poles (from among the upper outer poles 218 and the lower outer poles 220) are, at the time of measurement, located closest to the gravitational low-point.

The sensor shuttle 114 may include a downhole controller 222, a block diagram of which is shown in FIG. 2-2. The downhole controller 222 may include, for example, memory and logic circuitry for control of various functions of the sensor shuttle 114. In particular, the downhole controller 222 can store shuttle pole position data 228 that indicates actual position information for each electromagnet pole piece of the sets of upper outer poles 218 and lower outer poles 220, pole position data that indicates the position at the time of measurement of permanent magnet poles on two inner rotors 340 (a top inner rotor and a bottom inner rotor respectively, discussed further below with respect to FIG. 3-1) as well as the degree of the geometric offset 225. The downhole controller 222 may receive from the gravity detector 223 directional data 229 indicative of measurements by the gravity detector 223 for a particular direction, such as that of gravity. The downhole controller 222 may additionally include logic circuitry for rotor actuator drive control 230 that actuates the inner rotors 340, and magnet electrical activation control 232 that selectively provides electric current to some of the electromagnetic pole pieces 226 for magnetization. In an embodiment, the downhole controller 222 may use output from the gravity detector 223 to determine when the sensor shuttle 114 is stationary, and activate clamping to the select direction in response to a determination that the sensor shuttle 114 is stationary.

Figures 1, 3:
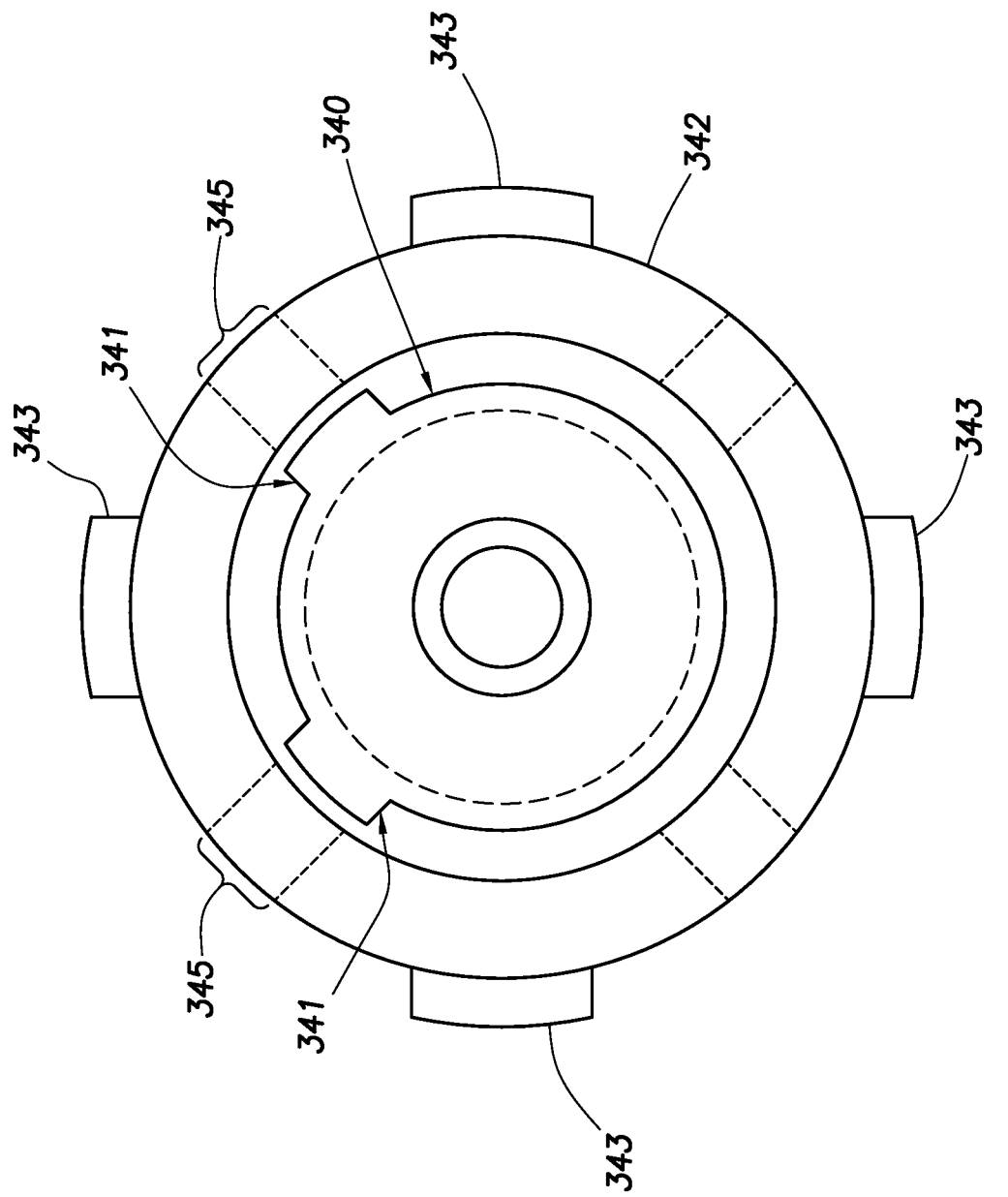
Figures 2, 3:
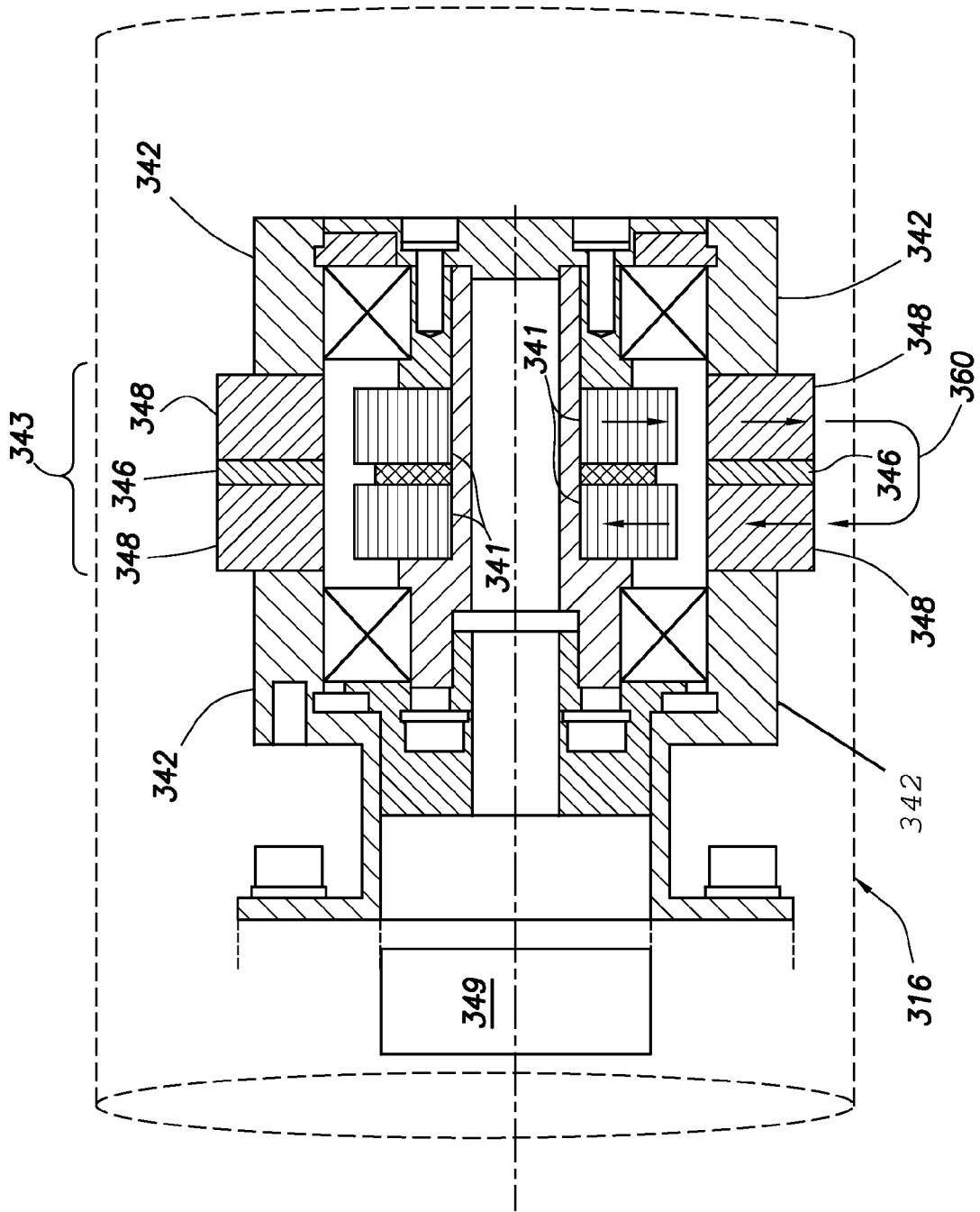
Figure 3:
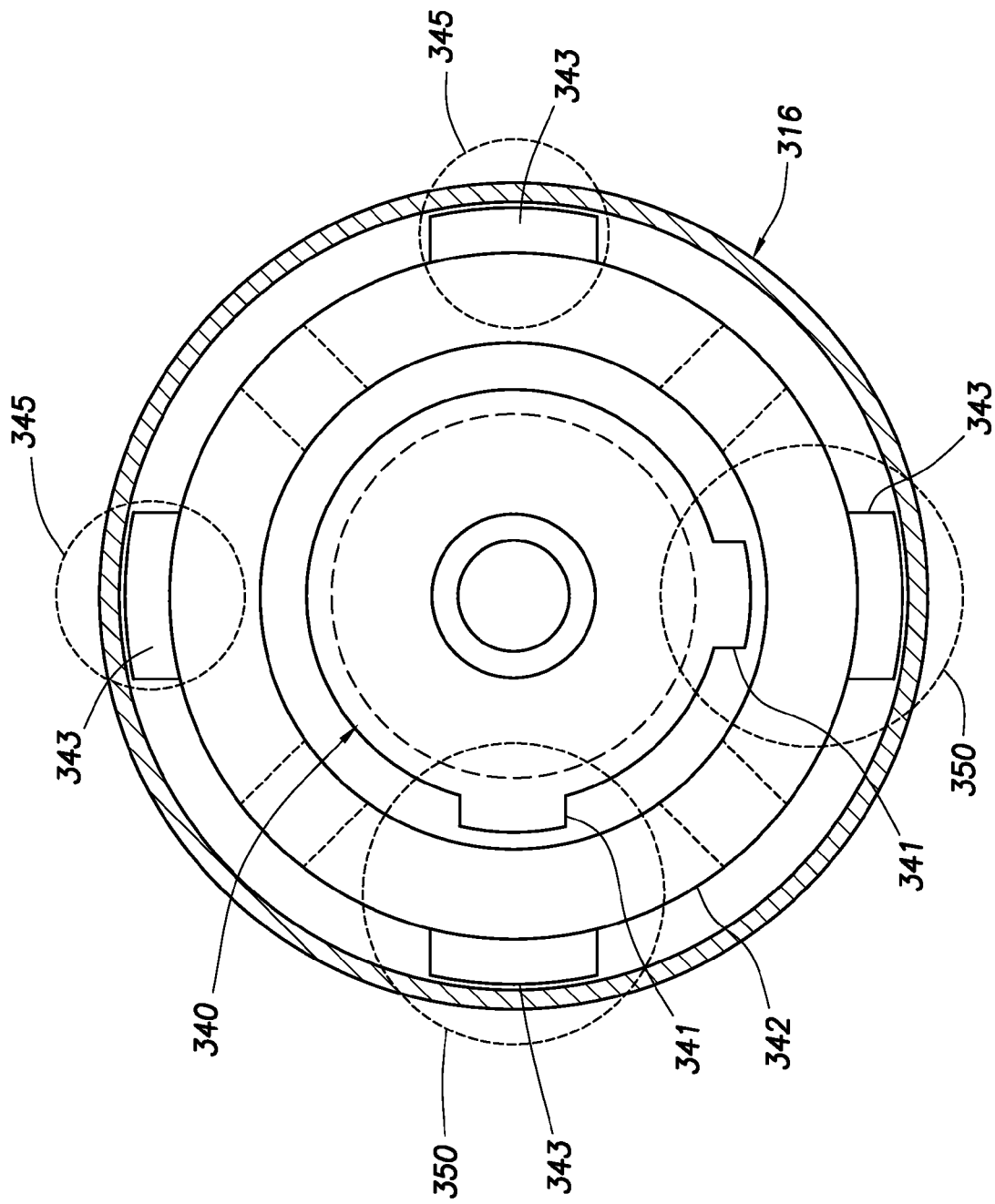

FIG. 3-1 shows a top view cross-section of an embodiment of a magnetic clamp for a downhole sensor shuttle 114 revealing the permanent magnet internal components of the sensor shuttle 114 noted above. As shown in FIG. 3-1, for both the top and bottom clamping portions, an inner rotor 340 having a set of permanent magnetic inner rotor pole 341 (in this example, two) that may be actuated to various positions within a shuttle housing 342. The set of outer poles 343 are affixed to the shuttle housing 342. In an embodiment, both sets of upper and lower outer poles may be affixed to the exterior of the shuttle housing 342. When the inner rotor poles 341 are not aligned with the outer poles 343 (as can be seen in FIG. 3-1) in a misalignment position 345, the pathway from inner rotor 340 poles to outer poles is magnetically shorted, and no magnetic clamping force is generated.

FIG. 3-2 shows an alternative side view cross-section of the embodiment of FIG. 3-1, in which a geared motor 349 that actuates the inner rotor 340 is shown. Each outer pole 343 (of the sets of upper and lower outer poles) may include a portion of non-magnetic material 346 disposed between two pole pieces 348 of magnetic material, creating a flow pathway 360 for magnetic flux out a first pole piece 348, through adjacent casing 316, and back in a second pole piece 348 when the inner rotor poles 341 on the inner rotor 340 align with at least one outer pole 343 on outer rotor 342. The geared motor 349 may be driven, for example, by the rotor actuator drive control 230 to align the inner rotor poles 341 of the inner rotor 340 and at least some of the upper and lower outer poles 343, respectively. The controller 222 may use shuttle pole position data 228, pole position data that indicates the position, at the time of measurement, of inner rotor poles 341 on an inner rotor 340, the geometric offset 225, and the directional data 229 to determine, for example, the timing and degree of actuation applied by the rotor actuator drive control 230 to align or misalign the inner rotor poles 341 of the inner rotor 340 and the upper and lower outer poles 343 on outer rotor 342. Another outer pole 343 (shown on the upper side in FIG. 3-2) is not magnetized, in the embodiment shown in FIG. 3-2, because the outer pole 343 at the top of the figure is not located, at the time of measurement, on the gravitational low-side, and thus clamping on the side where the non-magnetized outer pole(s) 343 are located is counterproductive (i.e., clamping force would work against gravity rather than with gravity).

FIG. 3-3 shows an alternative top view cross-section of the embodiment of the magnetic clamp of FIG. 3-1. In FIG. 3-3, the inner rotor 340 is aligned such that the poles 341 of the inner rotor 340 are aligned with two of the four outer poles 343 in an alignment position 350. Positioned as such, and with electrical activation delivered to the outer poles 343 via the magnet electrical activation control 232, magnetic flux flows out of the inner rotor poles 341 through the outer pole pieces 348, through the casing 316, and back in through the outer pole pieces 348, to the inner rotor poles 341. The sensor shuttle 114 is thereby clamped magnetically to the casing 316 at the points where the outer pole pieces 348 contact the casing 316. The outer poles 343 that are in misalignment position 345, not aligned to the inner rotor poles 341, are not magnetized, as the outer poles 343 in the misalignment position are located on the gravitational high-side at the time of measurement, and thus, are not clamped to the casing 316.

Figures 3, 4:
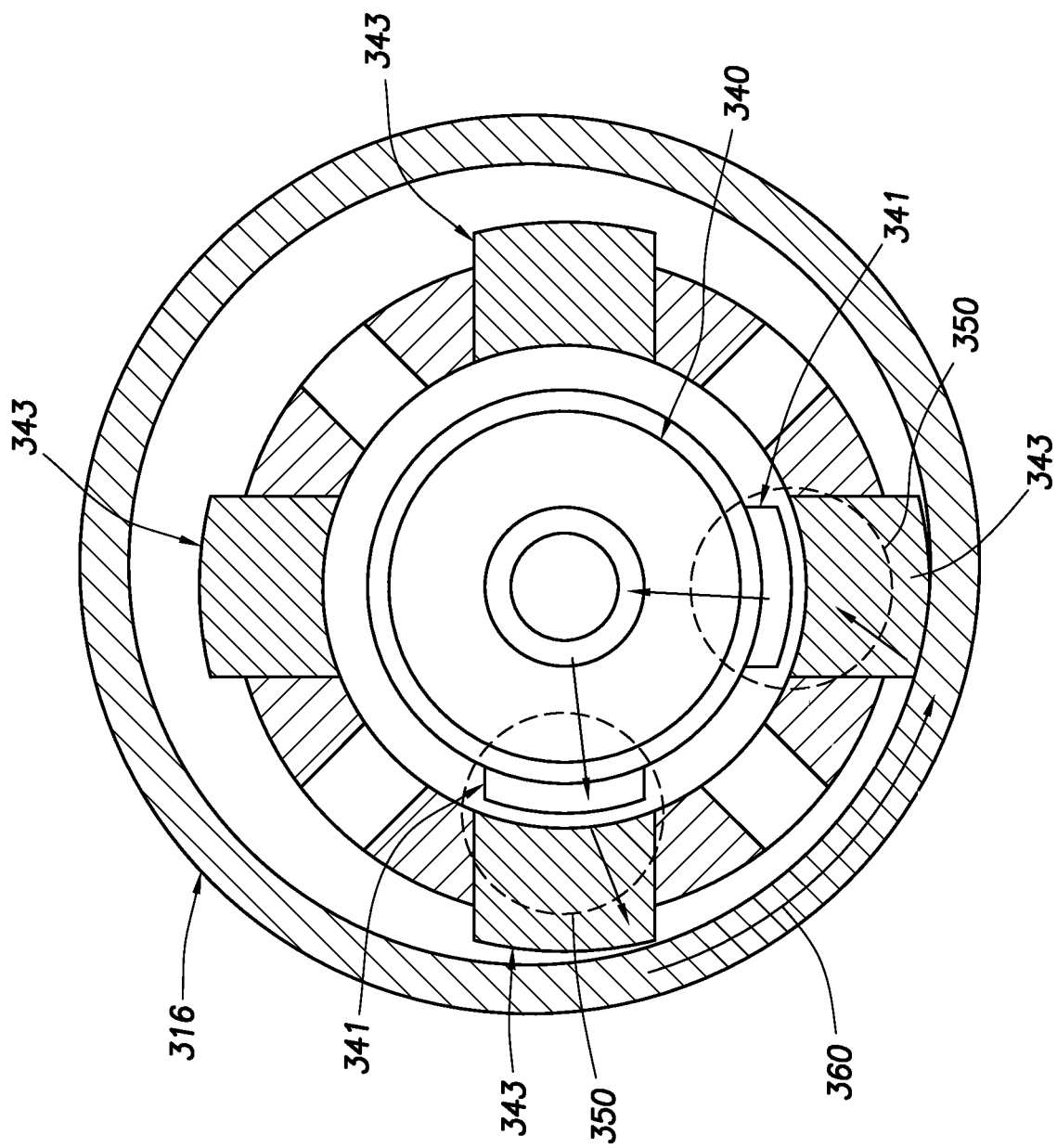
Figure 4:
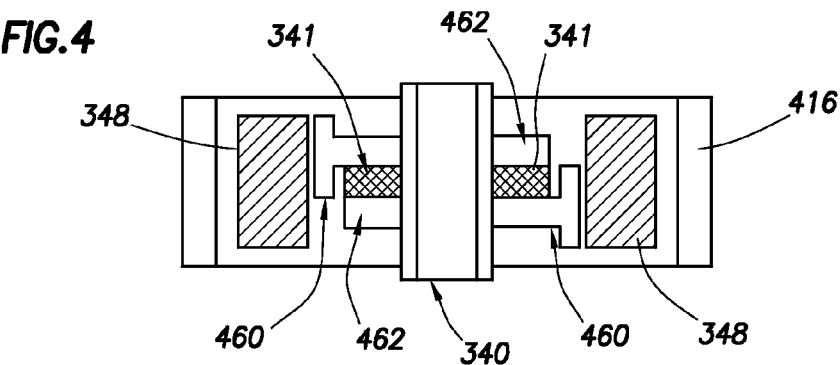

FIG. 3-4 shows a top view cross-section of a magnetic clamp for a downhole sensor shuttle when magnetically clamped illustrating the pathway for the magnetic flux during clamping. With the pole position data 228 and the directional data 229, the downhole controller 222 actuates the inner rotor 340 to a alignment position 350 with the rotor actuator driver control 230 such that the inner rotor poles 341 align with the outer poles 343 closest to the gravitational low-side. When the inner rotor poles 341 are aligned in the alignment position 350 to the outer poles 343 located on the gravitational low-side, the downhole controller 222 magnetizes the outer poles 343 located on the gravitational low-side with the magnet electrical activation control 232. When electrical current magnetizes the outer poles 343, magnetic flux 360 flows in a pathway (shown by arrows) through the inner rotor pole 341 into an outer pole 343, through the casing 316, back into the adjacent outer pole 343, and into the other inner rotor pole 341, as shown.

As shown in FIG. 2-1.1, for both the top and bottom clamping portions of the integral magnetic clamp, inner rotors 340 are provided having a set of permanent magnetic inner rotor poles 341, a set of outer poles 343, each of which is affixed to the shuttle housing 342.

FIG. 4 shows an alternative embodiment with detailed view of the inner and outer pole pieces of the magnetic clamp for a downhole sensor shuttle in accordance with an embodiment of the present disclosure. In the example embodiment shown in FIG. 4, the inner rotor 340 has inner rotor poles 341 affixed to each side. Additionally, a t-shaped non-magnetic piece 460 is affixed to each side of the inner rotor 340 adjacent to the inner rotor poles 341, as well as a non-magnetic block 462 affixed to each side of the inner rotor 340 adjacent to the inner rotor poles 341 opposite the t-shaped non-magnetic piece 460. During clamping when the inner rotor poles 341 are aligned to the outer pole pieces 348, as compared with the embodiment shown in FIG. 3-2, magnetic flux can flow out of the inner rotor pole 341 into the t-shaped non-magnetic piece 460, into the outer pole piece 348, into the casing 416, and return through the outer pole piece 348, and the non-magnetic block 462. FIG. 4 illustrates that the specific fabrication of magnetic and non-magnetic components of the inner rotor poles and outer poles may vary while remaining within the scope of the present disclosure.

Figure 5:
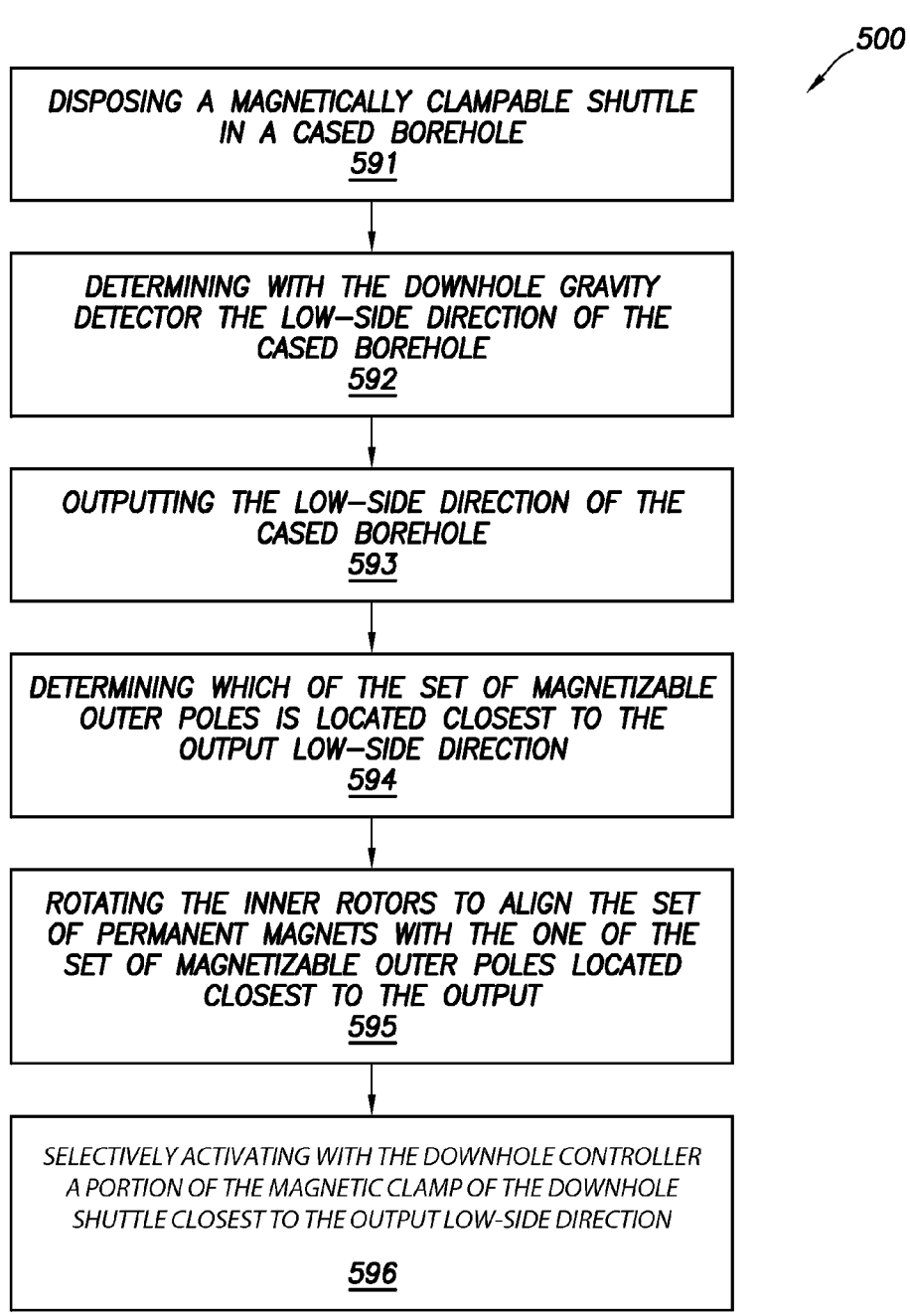
FIG. 5 is a flow chart depicting a method for magnetically clamping a downhole seismic shuttle in a particular direction in a borehole casing.

Turning now to FIG. 5, a flowchart is shown for a method 500 for magnetically clamping a downhole sensor shuttle to a select direction in a borehole casing (such as, e.g., in the direction of gravity to the low-side). The method can include disposing 591 a magnetically clampable shuttle such as that described above in a cased borehole. The magnetically clampable shuttle can include a sensor package that obtains a downhole measurement for the cased borehole. The magnetically clampable shuttle can include a magnetic clamp that removably autonomously clamps to the cased borehole. The magnetically clampable shuttle can include a directional detector that outputs a select direction of the cased borehole relative to the downhole shuttle (such as, for example, the low-side in the direction of gravity). The magnetically clampable shuttle can include a downhole controller that activates a portion of the magnetic clamp of the downhole shuttle closest to the output select direction.

The method can include determining 592 with the directional detector the low-side direction of the cased borehole. The method can include outputting 593 the low-side direction of the cased borehole.

The method can include determining 594 which of the set of magnetizable outer poles is located closest to the output low-side direction. The determining 594 can be based on stored relative position information relating to the magnetizable outer poles. The method can include rotating 595 the inner rotors to align the set of permanent magnets with the one of the set of magnetizable outer poles located closest to the output low-side direction. In an embodiment, with sets of upper and lower outer poles that are geometrically offset from one another, the set of magnetizable outer poles located closest to the output low-side direction may include at least one of both upper and lower outer poles in order to form a multiple point clamp.

The method can include selectively activating 596 with the downhole controller a portion of the magnetic clamp of the downhole shuttle closest to the output low-side direction.

The method can optionally include automatically activating with the downhole controller the portion of the magnetic clamp of the magnetically clampable shuttle when the magnetically clampable shuttle is stationary in the position, based on the output of the directional detector.

The method can optionally include selectively aligning the inner rotors with one of the magnetizable outer poles based on activation from the downhole controller.

During run in or pull out operations, the outer poles, upper or lower, may be de-activated, in order to reduce friction between the sensor shuttle 114 and the casing 216.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. An autonomously magnetically clamping downhole shuttle for clamping to a select direction of a borehole casing, comprising:

a sensor package configured to obtain a downhole measurement in a position in a cased borehole;

an integral magnetic clamp configured to removably clamp the downhole shuttle to the cased borehole;

a directional detector configured to output a select direction of the cased borehole relative to the downhole shuttle; and a downhole controller coupled to the integral magnetic clamp and the directional detector, configured to activate a portion of the integral magnetic clamp of the downhole shuttle closest to the select direction when the downhole shuttle is stationary in the position, based on any of several select direction outputs by the directional detector.

2. The shuttle according to claim 1, wherein the integral magnetic clamp comprises:

a set of magnetizable outer poles configured to contact the cased borehole;

at least a top inner rotor comprising a set of permanent magnets;

at least a bottom inner rotor comprising a set of permanent magnets, the top inner rotor and the bottom inner rotor being positioned with a geometric offset relative to one another; and the top inner rotor and the bottom inner rotor being configured to selectively align with at least one of the magnetizable outer poles based on activation from the downhole controller, forming a multiple point magnetic clamp between the downhole shuttle and the cased borehole.

3. The shuttle according to claim 2, wherein the set of magnetizable outer poles comprises four electromagnets, the geometric offset being 90 degrees.

4. The shuttle according to claim 2, wherein the set of magnetizable outer poles comprises six magnets, the geometric offset being 60 degrees.

5. The shuttle according to claim 2, wherein the downhole controller is further configured to activate a portion of the integral magnetic clamp closest to the select direction by:

determining which of the set of magnetizable outer poles is located closest to the select direction based on stored relative position information relating to the set of magnetizable outer poles; and rotating the top inner rotor and the bottom inner rotor to align the set of permanent magnets with the one of the set of magnetizable outer poles located closest to the select direction.

6. The shuttle according to claim 1, wherein the directional detector comprises one or more three-axis accelerometers.

7. The shuttle according to claim 1, wherein the select direction comprises a gravitational low-side direction.

8. An apparatus for autonomously magnetically clamping a downhole component to a select direction of a borehole casing, comprising:

a downhole component configured to clamp to a position in a cased borehole;

an integral magnetic clamp configured to removably clamp the downhole component to the cased borehole;

a directional detector configured to output a select direction of the cased borehole relative to the downhole component; and a downhole controller coupled to the integral magnetic clamp and the directional detector, configured to activate a portion of the integral magnetic clamp of the downhole component closest to the select direction when the downhole component is stationary in the position, based on any of several select direction outputs of the directional detector.

9. The apparatus according to claim 8, wherein the directional detector comprises one or more three-axis accelerometers.

10. The apparatus according to claim 8, wherein the integral magnetic clamp comprises:

a set of magnetizable outer poles configured to contact the cased borehole;

at least a top inner rotor comprising a set of permanent magnets;

at least a bottom inner rotor comprising a set of permanent magnets, the top inner rotor and the bottom inner rotor being positioned with a geometric offset relative to one another; and the top inner rotor and the bottom inner rotor being configured to selectively align with at least one of the magnetizable outer poles based on activation from the downhole controller, forming a multiple point magnetic clamp between the downhole component and the cased borehole.

11. The apparatus according to claim 10, wherein the set of magnetizable outer poles comprises four electromagnets, the geometric offset being 90 degrees.

12. The apparatus according to claim 10, wherein the set of magnetizable outer poles comprises six magnets, the geometric offset being 60 degrees.

13. The apparatus according to claim 10, wherein the downhole controller is further configured to activate a portion of the integral magnetic clamp closest to the select direction by:

determining which of the set of magnetizable outer poles is located closest to the select direction based on stored relative position information relating to the set of magnetizable outer poles; and rotating the top inner rotor and the bottom inner rotor to align the set of permanent magnets with the one of the set of magnetizable outer poles located closest to the select direction.

14. The apparatus according to claim 8, wherein the select direction comprises a gravitational low-side direction.

15. The apparatus according to claim 8, wherein the downhole component is a seismic sensor.

16. A method for autonomously magnetically clamping a downhole shuttle to a select direction of a borehole casing, comprising:

disposing a magnetically clampable shuttle in a cased borehole, the magnetically clampable shuttle comprising:

a sensor package configured to obtain a downhole measurement in a position in a cased borehole;

an integral magnetic clamp configured to removably clamp the magnetically clampable shuttle to the cased borehole;

a directional detector configured to output a select direction of the cased borehole relative to the magnetically clampable shuttle; and a downhole controller coupled to the integral magnetic clamp and the directional detector, configured to selectively activate the integral magnetic clamp of the magnetically clampable shuttle;

determining with the directional detector the select direction of the cased borehole;

selectively activating with the downhole controller a portion of the integral magnetic clamp of the magnetically clampable shuttle closest to the select direction; and activating with the downhole controller the portion of the integral magnetic clamp of the magnetically clampable shuttle when the magnetically clampable shuttle is stationary in the position, based on any of several select direction outputs by the directional detector.

17. The method according to claim 16, wherein:
the integral magnetic clamp comprises:
   a set of magnetizable outer poles configured to contact the cased borehole;
   at least a top inner rotor comprising a set of permanent magnets;
   at least a bottom inner rotor comprising a set of permanent magnets, the top inner rotor and the bottom inner rotor being positioned with a geometric offset relative to one another; and
the method further comprising:
selectively aligning the top inner rotor and the bottom inner rotor with one of the magnetizable outer poles based on activation from the downhole controller.

18. The method according to claim 17, further comprising:
determining which of the set of magnetizable outer poles is located closest to the output select direction based on stored relative position information relating to the magnetizable outer poles; and
rotating the top inner rotor and the bottom inner rotor to align the set of permanent magnets with the one or more of the set of magnetizable outer poles located closest to the select direction output by the directional detector.

19. The method according to claim 16, further comprising:
forming a multiple point magnetic clamp between the magnetically clampable shuttle and the cased borehole.

20. The method according to claim 16, wherein determining with the directional detector the select direction of the cased borehole further comprises determining with the directional detector the select direction as a gravitational low-side of the cased borehole.

* * * * *